United States Patent [19]

Takahashi

[11] Patent Number: 5,701,285
[45] Date of Patent: Dec. 23, 1997

[54] OPTICAL DATA REPRODUCING APPARATUS

[75] Inventor: Hideaki Takahashi, Hachioji, Japan

[73] Assignee: Olympus Optical Co., Ltd., Tokyo, Japan

[21] Appl. No.: 565,779

[22] Filed: Dec. 1, 1995

[30] Foreign Application Priority Data

Dec. 7, 1994 [JP] Japan .................. 6-303510

[51] Int. Cl.$^6$ ........................................ G11B 7/00
[52] U.S. Cl. .................. 369/59; 369/60; 369/58; 369/48
[58] Field of Search ................. 369/59, 60, 47, 369/48, 49, 54, 58, 124; 360/39, 32, 48

[56] References Cited

U.S. PATENT DOCUMENTS 5,237,554  8/1993  Senshu et al. ............... 369/59

FOREIGN PATENT DOCUMENTS

50-63843    5/1975   Japan .
51-114024  10/1976   Japan .

Primary Examiner—Muhammad N. Edun
Attorney, Agent, or Firm—Frishauf, Holtz, Goodman, Langer & Chick

[57] ABSTRACT

An optical data reproducing apparatus for reproducing data recorded on a predetermined optical data recording medium, comprising a converter circuit for converting an analog signal corresponding to data to be reproduced, to a digital data item, a data memory circuit for storing, in time sequence, a plurality of data items output from the converter circuit, a comparator circuit for comparing a predetermined one of the data items stored in the memory circuit are obtained in several times of storage operations before the present storage operation, with a data item presently stored in the memory circuit, an edge detecting circuit for detecting an edge of the analog signal on the basis of the comparison result, and a digitized signal generating circuit for generating a digitized signal on the basis of an output from the edge detecting circuit.

17 Claims, 8 Drawing Sheets

OPTICAL DATA REPRODUCING APPARATUS

BACKGROUND OF THE INVENTION

1. Field of the Invention

This invention relates to an optical data reproducing apparatus for reproducing data recorded on an optical data memory medium such as an optical card.

2. Description of the Related Art

Techniques relating to data processing have been remarkably developed and various types of means for storing a great amount of data have accordingly been contrived. The means includes an optical data recording medium for optically recording data, such as an optical card. Further, an optical card recording/reproducing unit for recording and reproducing data on and from the optical card is now available.

The optical card has a data recording layer. To record data on the optical card, a laser beam converged by a predetermined lens is radiated on the data recording layer, thereby forming a plurality of pits of different reflectances, of different shapes due to thermal deformation, or of different phases.

The memory capacity of the optical card is about several—ten thousands times of that of a conventional magnetic card. In the optical card, data cannot be rewritten as in the case of the known optical disk. However, since the optical card has as large a capacity as 1–2 Mbytes, it can be applied over a wide range. For example, it can be used as a bankbook, a portable map or a prepaid card for shopping. Moreover, by virtue of the feature of the optical card that data cannot be rewritten, the optical card can also be used as a private health management card, etc. which prohibits intentional data rewriting.

There are two types of data recording methods for recording data on the above-described optical data recording medium—a recording method of a mark-length scheme and that of a mark position scheme. In the mark-length scheme, "8–10 modulation", for example, is employed. In this method, signal detection is performed by detecting the opposite ends of each mark recorded on the recording medium. On the other hand, in the mark position scheme, "2–7 modulation", for example, is employed. In the method of the mark position scheme, signal detection is performed by detecting the position of each mark (pit) recorded on the recording medium.

In the mark-length scheme, signals corresponding to data items "1" and "0" must be detected at a high S/N ratio from analog signals picked up or read by a pickup. Therefore, it is desirable to set the slice level to the mean level of a reproduction signal level.

Figure 8:
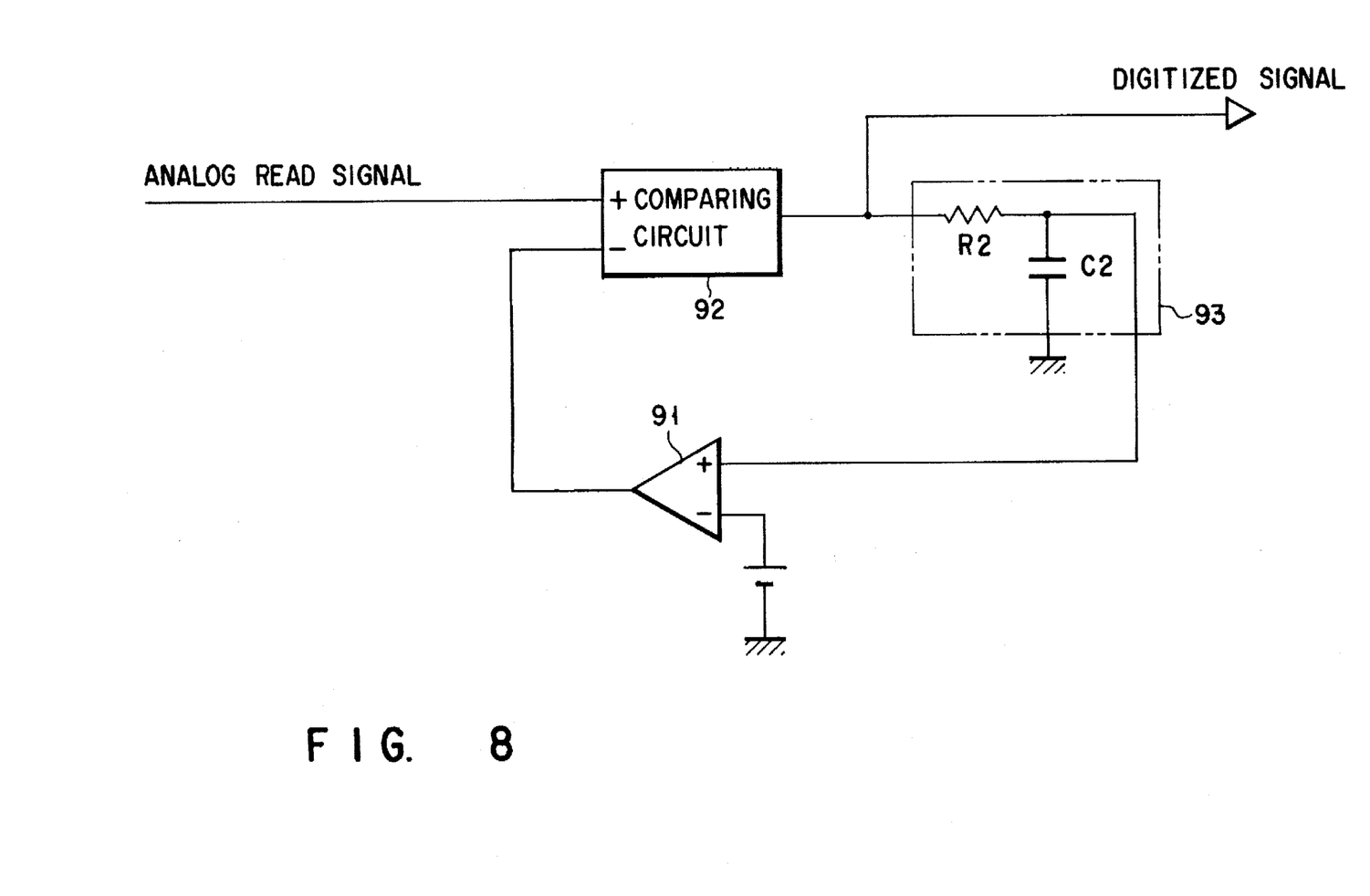
FIG. 8 is a schematic view, showing a conventional mark-length scheme digitized signal generating circuit.

FIG. 8 is a schematic view of a conventional digitized signal generation circuit which employs the mark-length scheme. As is shown in FIG. 8, a comparator circuit 92 compares an analog signal read by the pickup (hereinafter referred to as an "analog read signal") with a slice level (i.e. threshold level) signal output from an analog circuit 91. The comparison result is input to the analog circuit 91 via an integration circuit 93, and at the same time reproduced as a digitized output.

The above-described mark-length and mark position schemes differ from each other in the manner of reproduction. To make a single optical card recording/reproducing apparatus compatible with both the mark-length and mark position schemes, the apparatus must have two different circuits corresponding to the methods, respectively. As a result, the circuit structure of the apparatus will be complicated.

Moreover, where the surface of the recording medium is contaminated by a fingerprint, dust or the like, the level or amplitude of the analog read signal may well change in a complicated manner. In such a case, it is possible in the mark-length scheme that the slice level (threshold level) generated by the analog circuit will become an inappropriate value to the changed level or amplitude, and that signals of correct amplitudes will not be reproduced. This is particularly a serious problem for optical cards since the users directly touch them at the time of use.

SUMMARY OF THE INVENTION

It is the object of the invention to provide an optical data reproducing apparatus capable of reliably reproducing data recorded on a recording medium even if the surface of the medium is contaminated.

To attain the object, there is provided an optical data reproducing apparatus for reproducing data recorded on a predetermined optical data recording medium, comprising: a converter circuit for converting an analog signal corresponding to data to be reproduced, to a digital data item; a data memory circuit for storing, in time sequence, a plurality of data items output from the converter circuit; a comparator circuit for comparing a predetermined one of the data items stored in the memory circuit are obtained in several times of storage operations before the present storage operation, with a data item presently stored in the memory circuit; an edge detecting circuit for detecting an edge of the analog signal on the basis of the comparison result; and a digitized signal generating circuit for generating a digitized signal on the basis of an output from the edge detecting circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The embodiments of the invention will be explained with reference to the accompanying drawings.

Figure 1:
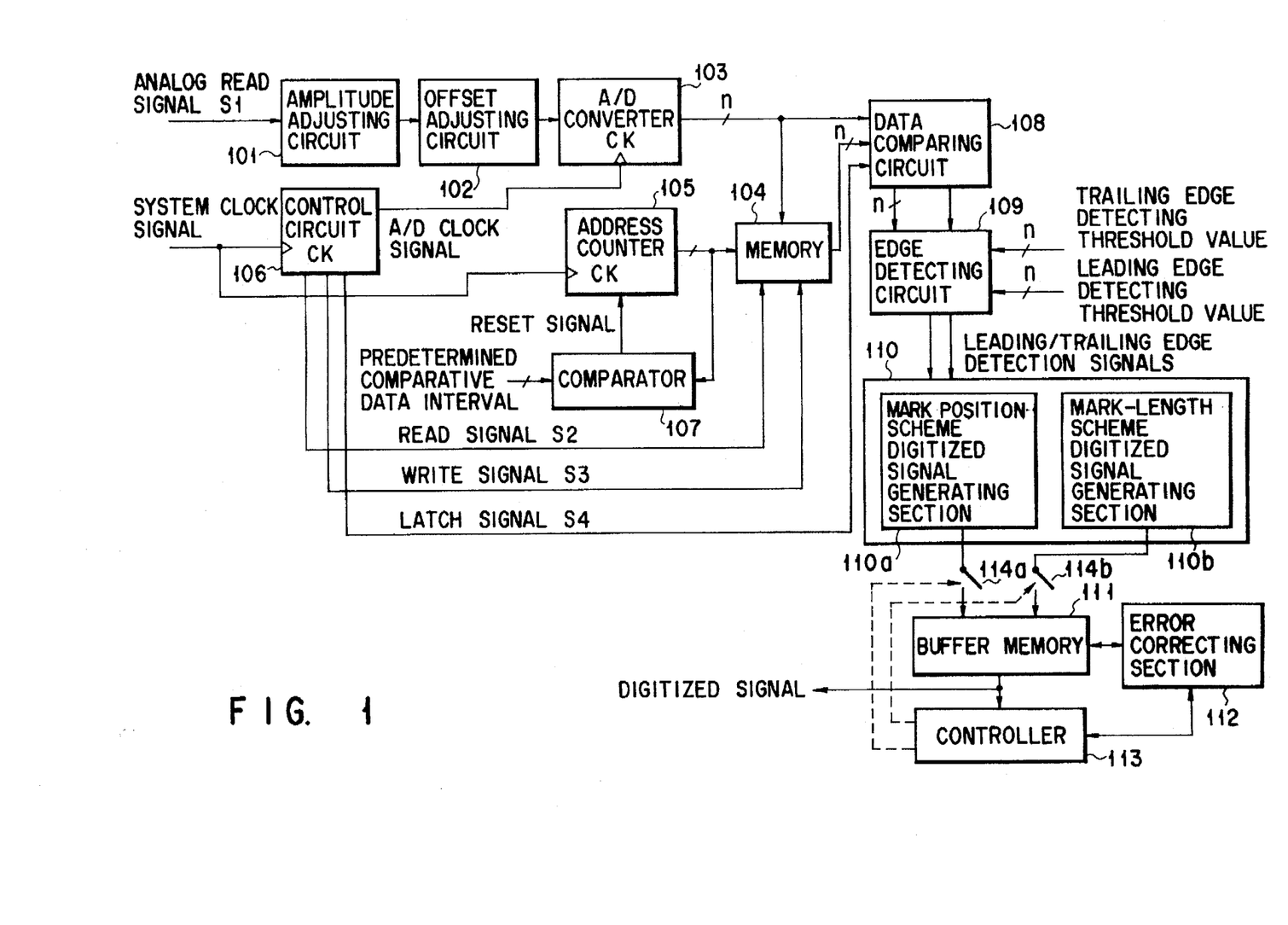
FIG. 1 is a block diagram, showing an optical data reproducing apparatus according to a first embodiment of the invention.

FIG. 1 is a block diagram, showing an optical data reproducing apparatus according to a first embodiment of the invention. The apparatus shown in FIG. 1 reproduces data stored in an optical card. This apparatus comprises an amplitude adjusting circuit 101, an offset adjusting circuit 102, an A/D converter 103, a memory 104, an address counter 105, a control circuit 106, a comparator 107, a data comparing circuit 108, an edge detecting circuit 109, a digitized signal generating circuit 110, a buffer memory 111, an error correcting section 112, a controller 113 and switches 114a and 114b. The digitized signal generating circuit 110 consists of a mark position scheme digitized signal generating section 110a and a mark-length scheme digitized signal generating section 110b.

In the optical data reproducing apparatus, the voltage of an input analog read signal S1 is adjusted to a value which falls within the input range of the A/D converter 103 via the amplitude adjusting circuit 101 and the offset adjusting circuit 102. At the same time, the amplitude and the offset value of the signal S1 are adjusted by the amplitude adjusting circuit 101 and the offset adjusting circuit 102, respectively, and then supplied to the A/D converter 103.

The A/D converter 103 converts the input analog signal to digital data of n bits, and supplies the data to the data comparing circuit 108 and the memory 104. The address counter 105 is of bits which enable count-up at least to a number of x (x is an integer equal to or more than 1). The address counter 105 performs count-up in the same cycle as sampling, and supplies the counted address value to the memory 104.

The memory 104 has a memory capacity capable of storing at least a number x of digital data items. The memory 104 stores n-bit digital data supplied from the A/D converter 103, in that part of its memory area which corresponds to the address value supplied from the address counter 105. Suppose that Dp represents a digital data item stored in the memory 104 and obtained by analog-to-digital converting, by the A/D converter 103, that part of the analog signal which is sampled at a voluntary sampling point p. Further, suppose that digital data is Dp-x, which is supplied from the A/D converter 103 to the memory 104 a number x of sampling cycles before the sampling point p. In this case, the memory 104 always stores a number x of digital data items from Dp-x to Dp-1.

The comparator 107 compares the address counter value supplied from the address counter 105 with a predetermined digital data interval value. If the former value is equal to the latter value, the comparator 107 generates a reset signal to reset the address counter 105. The predetermined digital data interval value (hereinafter referred to as a "predetermined comparative data interval value") is equal to the integer x.

The data comparing circuit 108 compares the digital data item Dp supplied from the A/D converter 103, with the digital data item Dp-x read from the memory 104, thereby calculating the difference therebetween. The edge detecting circuit 109 compares the difference calculated by the data comparing circuit 108, with a predetermined leading edge detection threshold value and a predetermined trailing edge detection threshold value, thereby detecting a leading edge detection signal and a trailing edge detection signal. On the basis of the leading edge detection signal and trailing edge detection signal, the digitized signal generating circuit 110 generates a mark-length scheme digitized signal in the mark position scheme digitized signal generating section 110a, and a mark position scheme digitized signal in the mark-length scheme digitized signal generating section 110b.

Figure 2:
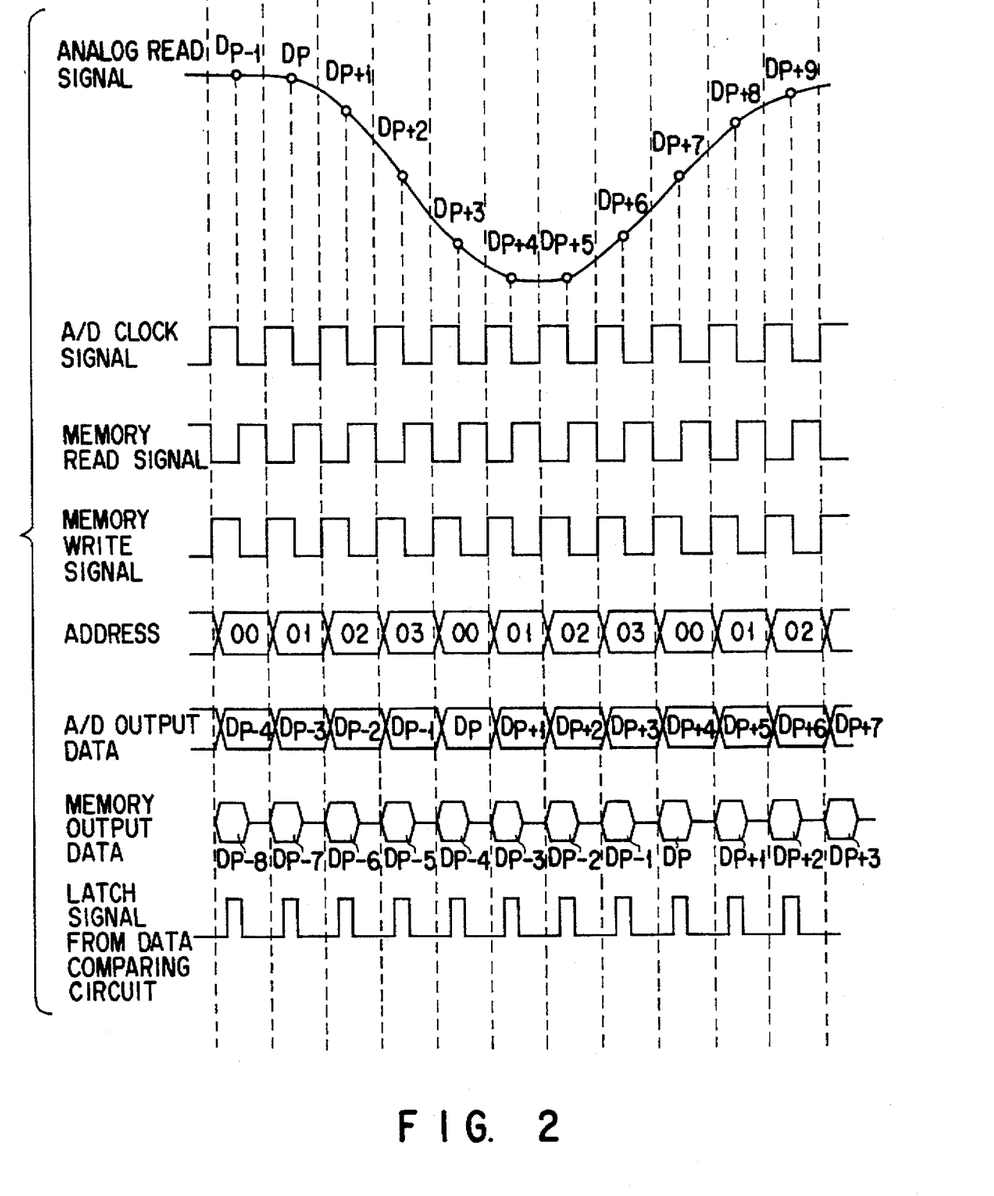
FIG. 2 is a timing chart, useful in explaining signal processing performed when a comparative data interval x is set to 4.

FIG. 2 is a timing chart, illustrating the procedure of signal processing in the case where the predetermined comparative data interval value x is set to 4. The A/D converter 103 samples the analog read signal in synchronism with the trailing edge of an A/D clock pulse supplied from the control circuit 106. After the sampling, the A/D converter 103 performs A/D conversion, and outputs the n-bit digital data item Dp to the memory 104 and the data comparing circuit 108 at a timing corresponding to the leading edge (rising edge) of the pulse obtained at 2.5 cycles from the trailing edge (falling edge) of the A/D clock pulse.

The digital data item DP-4 is supplied from the A/D converter 103 to the memory 104 and stored therein 4 sampling cycles before the digital data item Dp. The digital data item DP-4 is read, in synchronism with the output of the digital data item Dp from the A/D converter 103 and in response to a read signal S2 supplied from the control circuit 106. The read digital data item DP-4 is latched by the data comparing circuit 108 in response to a latch signal S4 supplied from the control circuit 106. Further, the digital data item Dp supplied from the A/D converter 103 to the memory 104 is stored therein in response to a write signal S3 supplied from the control circuit 106. Thereafter, the above-described processing relating to the analog read signal is repeated.

At the time of writing, in the above-described procedure, a pth digital data item Dp into that portion of the memory area of the memory 104, to which an address of xx is assigned, a series of operations described as below is repeated.

Address 00: read a (p−4)th data item and write a pth data item

Address 01: read a (p−3)th data item and write a (p+1)th data item

Address 02: read a (p−2)th data item and write a (p+2)th data item

Address 03: read a (p−1)th data item and write a (p+3)th data item

The counter value is reset and returned to address 00.

Address 00: read a pth data item and write a (p+4)th data item

Address 01: read a (p+1)th data item and write a (p+5)th data item

In response to a latch signal S4 supplied from the control circuit 106, the data comparing circuit 108 simultaneously latches the digital data item Dp supplied from the A/D converter 103 and the digital data item DP-4 supplied from the memory 104, compares the digital data items, and outputs the comparison result to the edge detecting circuit 109.

Figure 3:
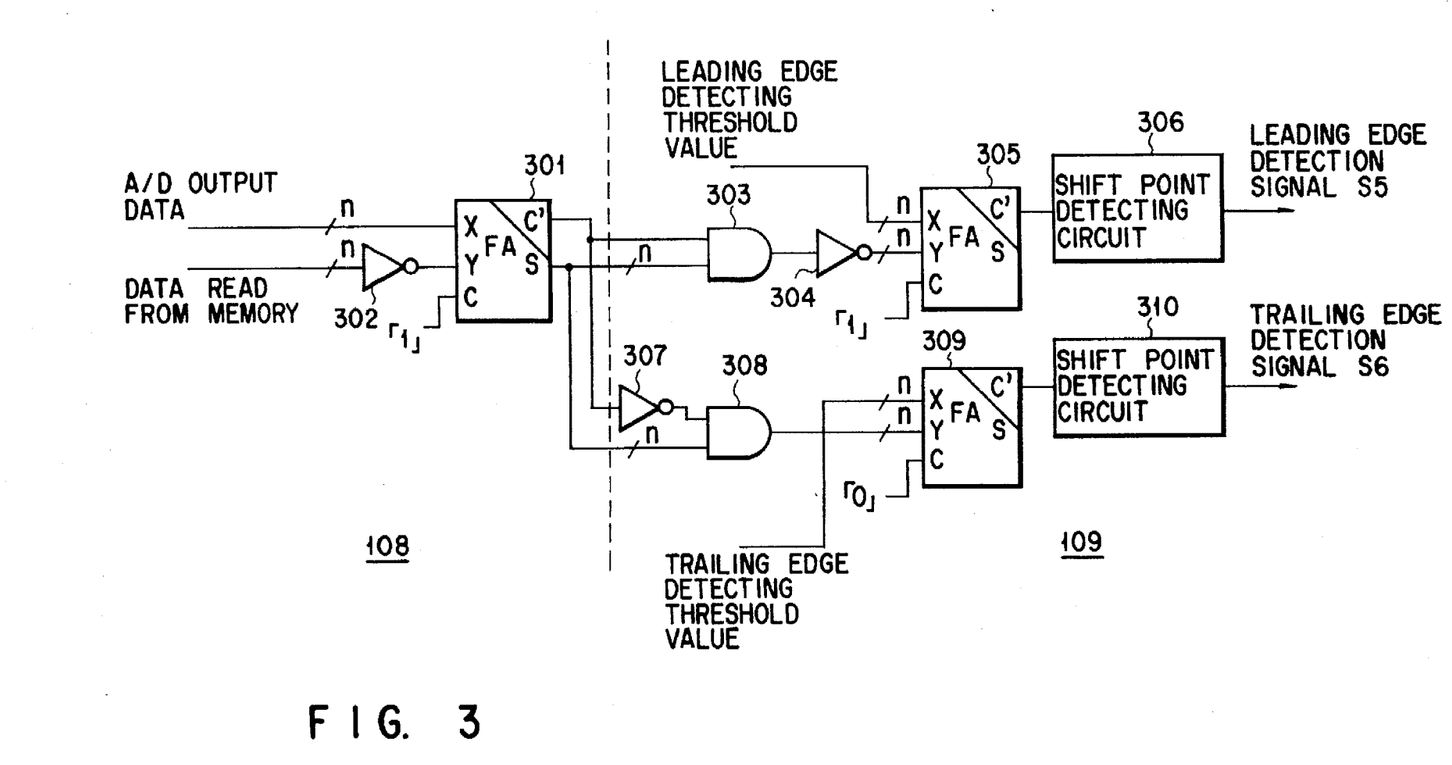
FIG. 3 is a view, showing basic structures of a data comparing circuit and an edge detecting circuit.

FIG. 3 shows basic structures of the data comparing circuit 108 and the edge detecting circuit 109. In the data comparing circuit 108, the digital data item Dp from the A/D converter 103 is input, as a minuend, to an input terminal X of an n-bit full adder circuit 301. Further, the digital data item DP-X read from the memory 104 is inverted by an inverter 302, and then input, as a subtrahend, to an input terminal Y of the full adder circuit 301. Then, "1" is input to an input terminal C of the circuit 301, thereby performing subtraction between the input data items Dp and DP-X.

If, as a result of subtraction, the output of an output terminal C' of the full adder circuit 301 is "1", it indicates that Dp is higher than Dp-x, and the output data item Sp of an output terminal S of the full adder circuit 301 is "Dp–DP-X". On the other hand, if the output of the output terminal C' of the full adder circuit 301 is "0", it indicates that Dp is lower than Dp-x, and the output data item Sp of the output terminal S of the full adder circuit 301 is a complement of "DP-X–Dp".

In the edge detecting circuit 109, the leading edge detecting threshold value (predetermined value) is supplied, as a minuend, to an input terminal X of a full adder circuit 305 of n bits, when the output of the output terminal C' of the full adder circuit 301 is "1", i.e. when "Dp>Dp-x". Further, data item Sp output from an AND gate 303 is inverted by an inverter 304, and supplied, as a subtrahend, to an input terminal Y of the full adder circuit 305. Then, "1" is input to an input terminal C of the circuit 305, thereby performing subtraction between the leading edge detecting threshold value and the data item Sp.

If, as a result of subtraction, the output of an output terminal C' of the full adder circuit 305 is "0", it indicates that the data item Sp is higher than the leading edge detecting threshold value. The point at which the output of the output terminal C' of the circuit 305 has shifted from "1" to "0" is set as a leading edge detection point. A shift point detecting circuit 306 detects the shift point of the output of the output terminal C' from "1" to "0". Upon detection of the point, the shift point detecting circuit 306 supplies a leading edge detection signal S5 to the digitized signal generating circuit 101 shown in FIG. 1.

On the other hand, if the output of the output terminal C' of the full adder circuit 301 is "0", i.e. if Dp is lower than Dp-x, the trailing edge detecting threshold value (predetermined value) is supplied, as a summand, to an input terminal X of a full adder circuit 309 of n bits. Further, data item Sp output from an AND gate 308 is supplied, as an addend, to an input terminal Y of the full adder circuit 309. Then, "0" is input to an input terminal C of the circuit 309, thereby performing addition of the trailing edge detecting threshold value to the data item Sp.

If, as a result of addition, the output of an output terminal C' of the full adder circuit 309 is "0", it indicates that the data item Sp is higher than the trailing edge detecting threshold value. The point at which the output of the output terminal C' of the circuit 309 has shifted from "1" to "0" is set as a trailing edge detection point. A shift point detecting circuit 310 detects the shift point of the output of the output terminal C' from "1" to "0". Upon detection of the point, the shift point detecting circuit 310 supplies a trailing edge detection signal S6 to the digitized signal generating circuit 101 shown in FIG. 1.

As described above, the digitized signal generating circuit 110, which consists of the mark position scheme digitized signal generating section 110a and the mark-length scheme digitized signal generating section 110b, and generates two types of digitized signals. The mark position scheme digitized signal generating section 110a is responsive to mark position scheme data, and detects a center point between the trailing edge detection signal S6 and the leading edge detection signal S5. The center point is set as the position of each pit of an optical card. The section 110a then outputs, as a pit detection pulse, a digitized signal corresponding to the center point. On the other hand, the mark-length scheme digitized signal generating section 110b is responsive to mark-length scheme data, and outputs, as a pit detection pulse, a digitized signal which is set to "L (low)" level when the trailing edge detection signal S6 has been detected, and to "H (high)" level when the leading edge detection signal has been detected.

The controller 113 shown in FIG. 1 turns on only one of the switches 114a and 114b. If the switch 114a is turned on and the switch 114b is turned off, the buffer memory 111 stores a digitized signal corresponding to mark position scheme digitized signal output from the mark position scheme digitized signal generating section 110a. The digitized signal stored in the buffer memory 111 is supplied to the error correcting section 112, which in turn subjects the digitized signal to error correction. If error correction is performed, the corrected digitized signal is supplied to the buffer memory 111 and then to a demodulation circuit (not shown).

If, on the other hand, error correction cannot be done in the error correcting section 112, it is understood that the digitized signal supplied from the mark position scheme digitized signal generating section 110a to the buffer memory 111 is not correct signal. In other words, it is understood that the analog read signal S1 is not a mark position scheme signal but a mark-length scheme signal.

Subsequently, the controller 113 turns off the switch 114a and turns on the switch 114b. Then, a mark-length scheme digitized signal is generated from the mark-length scheme digitized signal generating section 110b, and stored in the buffer memory 111. This digitized signal is supplied from the memory 111 to the error correcting circuit 112, which in turn subjects the digitized signal to error correction. In this case, error correction can be performed. Therefore, the corrected digital signal is supplied to the buffer memory 111 and then to the demodulation circuit.

Although in the above explanation, the switches 114a and 114b are first turned on and off, respectively, they may be turned off and on, respectively. Although in the latter case, first, mark-length scheme data generated by the mark-length scheme digitized signal generation section 110b is subjected to error correction, the same digitized signal as in the former case is supplied to the demodulation circuit. It is a matter of course that if the analog read signal S1 is a mark position scheme signal, a digitized signal of the mark position scheme is supplied to the demodulation circuit after the error correction.

As described above, in the first embodiment, the analog read signal S1 read from a recording medium such as an optical card is converted to digital data by the A/D converter 103, and the digital data is compared by the data comparing circuit 106 with data previously stored in the memory 104. On the basis of the comparison results, slight changes in the analog read signal S1, i.e. the trailing and leading edge portions of the analog read signal S1, are detected by the shift point detecting circuits 310 and 306, respectively.

Therefore, in the above-described optical data reproducing apparatus, the components which have different structures to process data items recorded by different recording methods are only the digitized signal generating circuit 110, which generate digitized signals based on edge portions of the detected analog read signal S1. The other components of the data reproducing apparatus are commonly used to process signals of both the schemes. Accordingly, it is not necessary to employ, in the data reproducing apparatus, those two groups each consisting of various circuits, which are adapted to the mark-length method and the mark position method, respectively. Thus, the overall apparatus can have a more simple structure than the conventional data reproducing apparatus.

In addition, the buffer memory 111 and the error correction section 112 can promptly determine whether the digitized signal generated by the digitized signal generating circuit 110 is a mark-length scheme reproduction output or a mark position scheme reproduction output. Even when the analog read signal S1 has altered in level and/or amplitude, the edges of the analog read signal S1 can be reliably detected by setting, to appropriate values, the predetermined comparative data interval value used in the data comparison circuit 108, and the leading/trailing edge detecting threshold values.

In the first embodiment, the analog read signal S1 contains noise which may cause erroneous edge detection. To reduce the degree of influence of the noise, the average of a number m of digital data items output from by the A/D converter 103 is calculated in a second embodiment.

Figure 4:
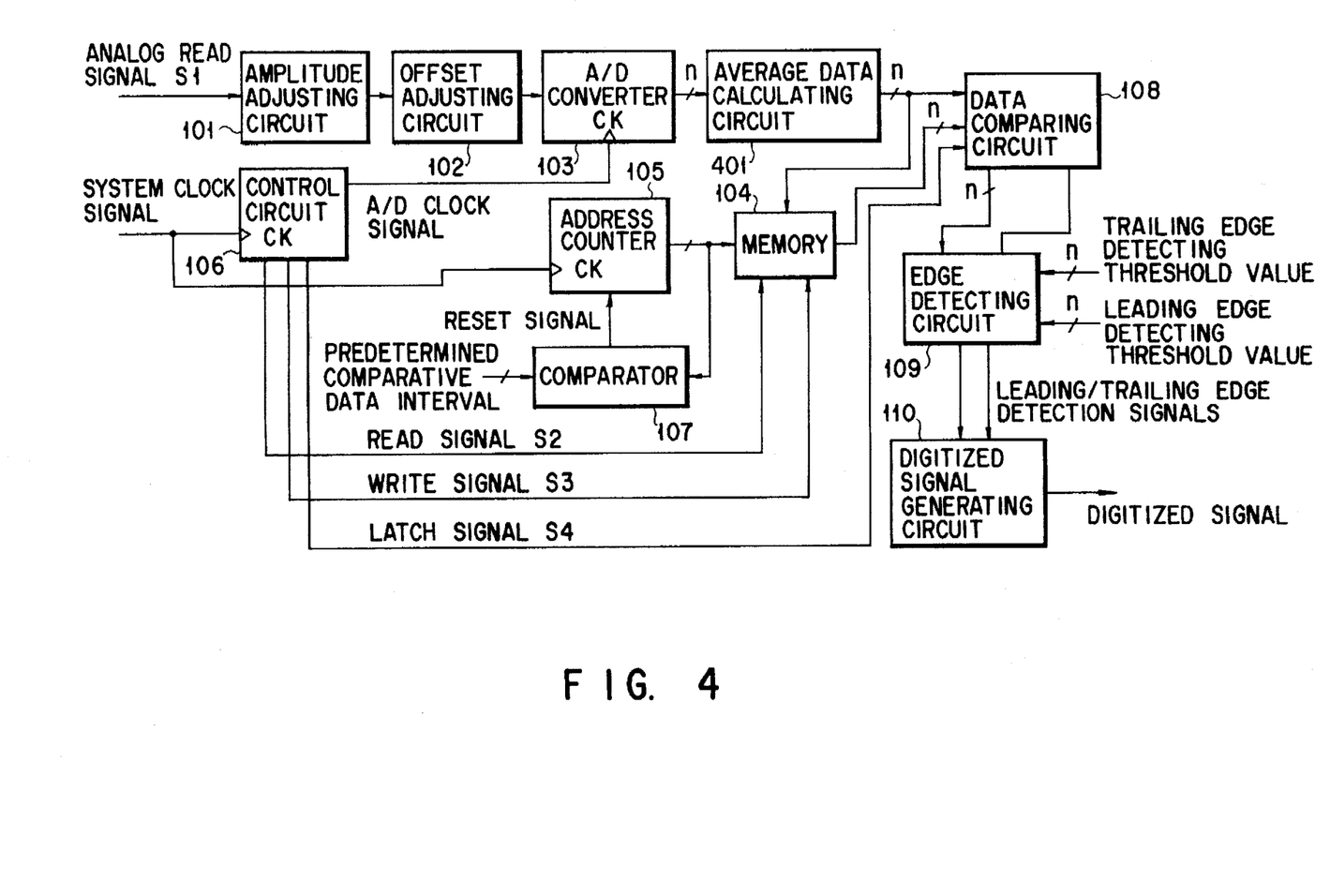
FIG. 4 is a block diagram, showing an optical data reproducing apparatus according to a second embodiment of the invention.

FIG. 4 is a schematic view of an optical data reproducing apparatus according to the second embodiment. In FIG. 4, elements similar to those in FIG. 1 are denoted by corresponding reference numerals. In the case of FIG. 4, a data average circuit 401 is connected to the output terminal of the A/D converter 103.

In the optical data reproducing apparatus of the second embodiment, the voltage of the input analog read signal S1 is adjusted to a value which falls within the input range of the A/D converter 103 via the amplitude adjusting circuit 101 and the offset adjusting circuit 102. At the same time, the amplitude and the offset value of the signal S1 are adjusted by the amplitude adjusting circuit 101 and the offset adjusting circuit 102, respectively, and then supplied to the A/D converter 103.

The A/D converter 103 converts the input analog signal to digital data of n bits, and supplies the data to the data average circuit 401, which in turn calculates the average of a number m of digital data items. If m=8, the circuit 401 sequentially calculates the average of (Dp-7, Dp-6, ..., and Dp), the average of (Dp-6, Dp-5, ..., and Dp+1), the average of (Dp-5, Dp-4, ..., and Dp+2), ....

The average of digital data items Dp-(m+1), ..., and Dp calculated by the data average circuit 401 is represent by reference sign Ap. The memory 104 stores a data item Ap output from the average circuit 401, in that portion of the memory area which corresponds to an address value supplied from the address counter 105.

The data comparing circuit 108 compares the data item Ap supplied from the data average circuit 401, with the data item Ap-x (x indicates a comparative data interval) read from the memory 104. The following processes performed by the data comparing circuit 108, the edge detecting circuit 109 and the digitized signal generating circuit 110 are similar to those performed in the first embodiment.

Since in the above-described second embodiment, the average of a number m of digital data items is calculated by the data average circuit 401, no great influence is caused by a slight change in a data value due to noise contained in the analog read signal S1. As a result, erroneous edge detection can be prevented and hence highly reliable data reproduction can be performed.

Further, as aforementioned, where a fingerprint or dust is adhered to the surface of the recording medium (the optical card) or the recording medium is contaminated, the level or amplitude of the analog read signal may change in a complicated manner, or may be reduced. If the amplitude becomes extremely small and the amount of change in an edge portion of the signal to be detected is lower than a predetermined threshold value, edge detection can hardly be performed. To enable reliable edge detection, the trailing and leading edge detecting threshold values are altered in accordance with the level fluctuation of the analog read signal in a third embodiment.

Figure 5:
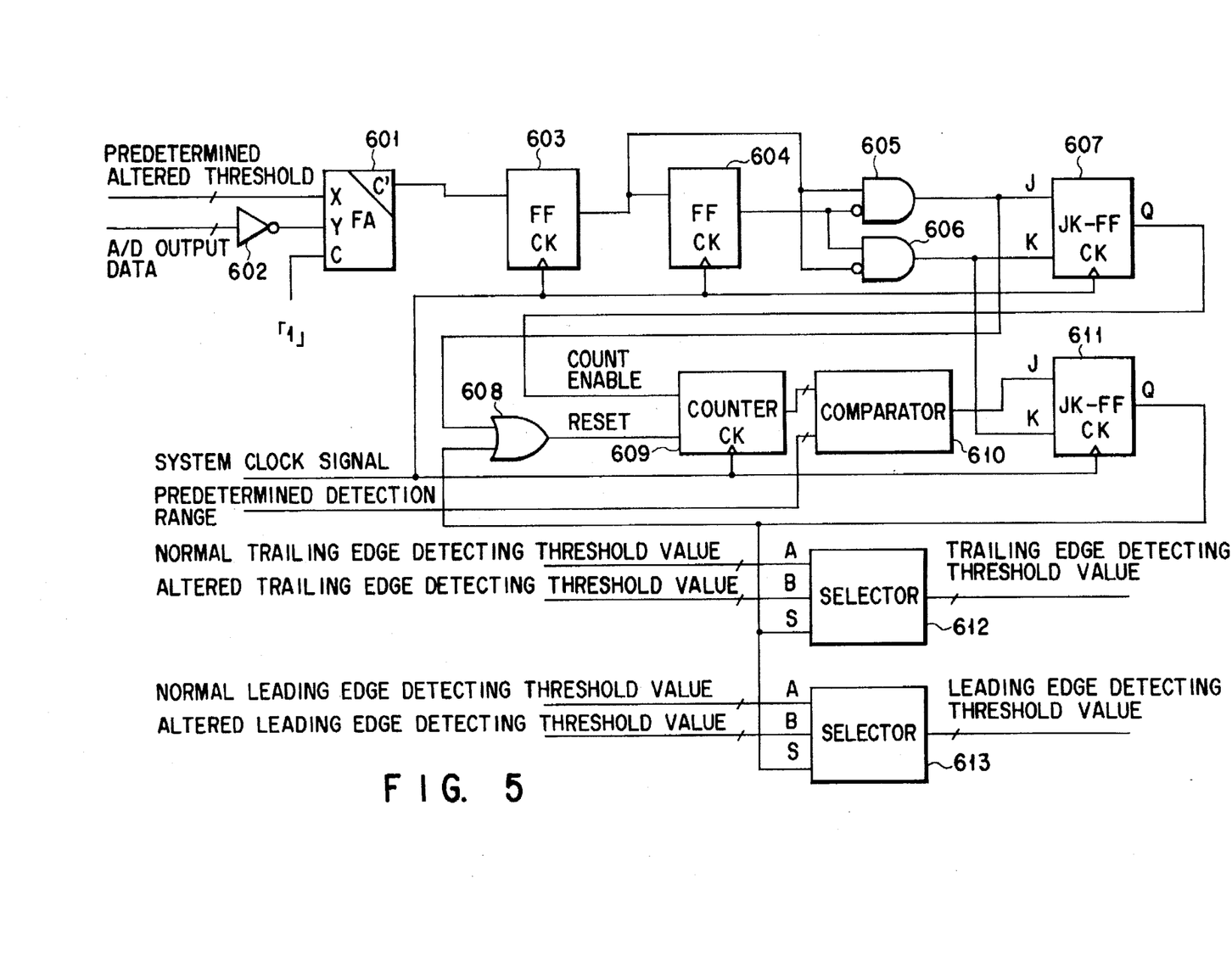
FIG. 5 is a schematic view, showing a circuit for changing an edge detecting threshold value according to a third embodiment of the invention.

FIG. 5 is a schematic view of a circuit for altering an edge detecting threshold value according to the third embodiment. In the FIG. 5 structure, a predetermined altered threshold value is input, as a minuend, to an input terminal X of a full adder circuit 601 of n bits. Further, the digital data item Dp supplied from the A/D converter 103 is inverted by an inverter 602, and then input, as a subtrahend, to an input terminal Y of the full adder circuit 601. Then, "1" is input to an input terminal C of the circuit 601, thereby performing subtraction between the data item Dp and the predetermined altered threshold value. The predetermined altered threshold value is set slightly higher than that the maximum value of the amplitude of the analog read signal, which is assumed when the analog read signal has reduced in level and amplitude and therefore a change in level at a to-be-detected edge portion of the signal is lower than a normal edge detecting threshold value.

If, as a result of subtraction, the output of an output terminal C' of the full adder circuit 601 is "0", it indicates that the data item Dp output from the A/D converter 103 is equal to or higher than the predetermined altered threshold value. On the other hand, if the output of the output terminal C' of the full adder circuit 601 is "1", it indicates that the data item Dp is lower than the predetermined altered threshold value.

Subsequently, D-FF circuits 603 and 604 and AND gates 605 and 606 detect trailing and leading edges of a signal output from the output terminal C' of the full adder circuit 601. A signal indicative of the leading edge is supplied from the AND gate 605 to the reset input of a counter 609 with a via the input terminal J of a JK-FF circuit 607 and an OR gate 608. A signal indicative of the trailing edge is supplied from the AND gate 606 to the input terminal K of the JK-FF circuit 607 and the input terminal K of a JK-FF circuit 611.

An output Q from the output terminal Q of the JK-FF circuit 607 is supplied, as a count enable signal, to the counter 609. The counter 609 is an up-counter for counting up in synchronism with system clock pulses, and counts up while the count enable signal is being supplied. The counter 609 is reset by a signal indicative of the leading edge of the output of the output terminal C' of the full adder circuit 601, and also by the output Q of the JK-FF circuit 611.

The count value of the counter 609 is supplied to a comparator 610, and compared with a predetermined detection range. If it is determined, as a result of comparison, that the count value is equal to the predetermined detection range, the comparator 610 supplies the input terminal J of the JK-FF circuit 611 with a signal indicating that the ranges are equal to each other. The predetermined detection range is set equal to or larger than a maximum pit interval.

Thus, the output Q of the JK-FF circuit 611 indicates that the output data item Dp of the A/D converter 103 is lower than the predetermined altered threshold value over a range equal to or more than the predetermined detection range. In other words, it is determined from the output Q that the analog read signal reduces in level and amplitude.

On the other hand, the output Q of the JK-FF circuit 611 is supplied, as a select signal, to an input terminal S of each of selectors 612 and 613. The selector 612 selects a trailing edge detecting threshold value for a normal state (hereinafter referred to as a "normal trailing edge detecting threshold value"), which is input to an input terminal A thereof while no select signal is supplied. The selector 612 selects a trailing edge detecting threshold value for an abnormal state (hereinafter referred to as an "altered trailing edge detecting threshold value), which is input to an input terminal B thereof while the select signal is supplied. Further, the selector 613 selects a leading edge detecting threshold value for a normal state (hereinafter referred to as a "normal leading edge detecting threshold value"), which is input to an input terminal A thereof while no select signal is supplied. The selector 613 selects a leading edge detecting threshold value for an abnormal state (hereinafter referred to as an "altered leading edge detecting threshold value), which is input to an input terminal B thereof while the select signal is supplied.

The outputs of the selectors 612 and 613 are used as a trailing edge detecting threshold value and a leading edge detecting threshold value, respectively, and supplied to the edge detecting circuit 109 shown in FIG. 1.

In the above-described third embodiment, the normal trailing edge and leading edge detecting threshold values are set to optimal values for a normal digitized signal corresponding to a normal analog read signal with normal level and amplitude. On the other hand, the altered trailing edge and leading edge detecting threshold values are set to values which enable edge detection even when the analog read signal reduces in level and amplitude because of contamination of the surface of the recording medium by a fingerprint, dust or something. As a result, edge detection can be performed even if a change in level at a to-be-detected edge portion of the analog read signal is equal to or lower than the normal trailing/leading edge detecting threshold values.

Although in the third embodiment, edge detection can be performed in a reliable manner by selecting one of two edge detecting threshold values, the invention can be modified such that more than two altered threshold values and more than two altered trailing/leading edge detecting threshold values corresponding thereto are set in order to perform more reliable edge detection.

As explained above, where the surface of a recording medium is contaminated by a fingerprint, dust or something, the analog read signal reduces in level and amplitude. If the amplitude of the signal is extremely small and a change in level at a to-be-detected edge portion of the signal is equal to or lower than the edge detecting threshold value, it is possible that the edge is not detected. To facilitate the edge detection, in a fourth embodiment, the top level of a reference voltage to be applied to the A/D converter at the time of conversion is altered in accordance with changes in the level of the analog read signal.

Figure 6:
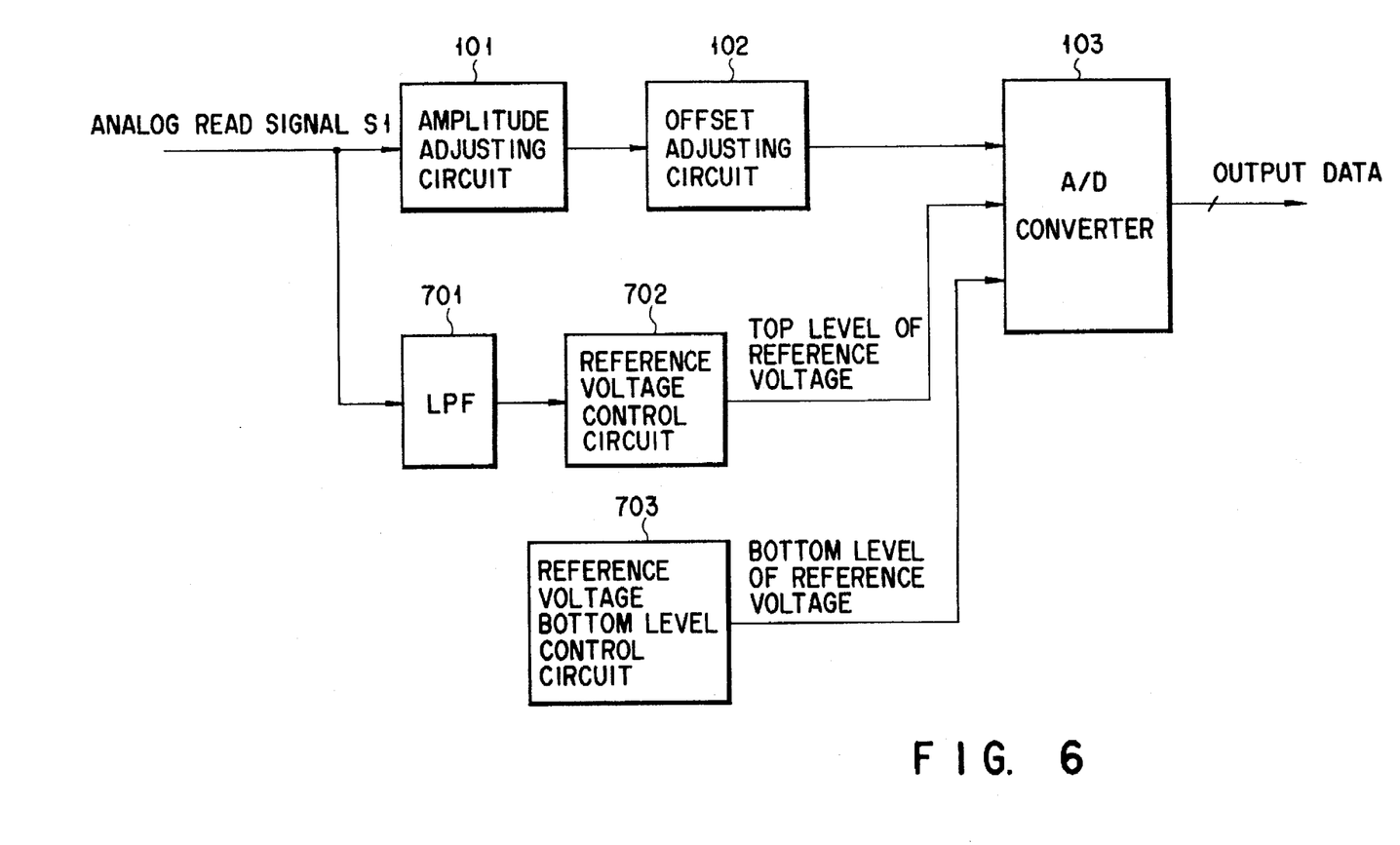
FIG. 6 is a schematic block diagram, showing a digital conversion circuit according to a fourth embodiment of the invention.

FIG. 6 is a schematic block diagram, showing a digital conversion circuit according to the fourth embodiment of the invention. In FIG. 6, similar elements to those in FIG. 1 are denoted by corresponding reference numerals. In general, the frequency of waviness due to changes in the level of the analog read signal S1 is lower than the frequency obtained when data recorded on the recording medium is reproduced. The waviness component of the analog read signal S1 is extracted using a lowpass filter (LPF) 701, and supplied to a reference voltage control circuit 702.

The control circuit 702 adjusts the offset value and amplitude of the extracted signal component, to values which do not fall outside a range defined by predetermined upper and lower limits of the top level of the reference voltage. The controlled signal is supplied, as a signal indicative of the top level of the reference voltage, to the A/D converter 103. A reference voltage bottom level control circuit 703 supplies the A/D converter 103 with a signal indicative of the bottom level of the reference voltage. Since the signal indicative of the bottom level is kept constant, the dynamic range becomes narrower and the value of digital data output from the A/D converter 103 becomes higher, as the level of the analog read signal S1 becomes lower and the amplitude thereof accordingly becomes smaller. As a result, there are few cases where a change in level at a to-be-detected edge portion of the signal S1 is equal to or lower than the edge detecting threshold value, which facilitates the edge detection.

Although in the fourth embodiment, the top level of the reference voltage is altered by the reference voltage control circuit 702 as shown in FIG. 6, the bottom level of the reference voltage may be altered by the same circuit, instead of the top level. Moreover, both the top and bottom levels may be altered.

As explained above, in the fourth embodiment, the reference voltage applied to the A/D converter 103 at the time of conversion is altered in accordance with changes in the level and amplitude of the analog read signal S1. Therefore, even when the level and amplitude of the analog read signal S1 have altered and the amplitude has significantly reduced, edge detection can be performed and accordingly reliable reproduction of data can be performed.

Digitized signals generated by the optical data reproducing apparatus are discriminated using a bit clock signal. For example, in the case of the mark position scheme, if a pit detection pulse is output as a digitized signal when the bit clock signal is "1", it is determined that there is a data item of "1". If, on the other hand, no pit detection pulse is output when the bit clock is "1", it is determined that there is a data item of "0". Moreover, the bit clock signal has its cycle corrected on the basis of comparison in phase between itself and the digitized signal, so as to prevent deviation in phase therebetween.

However, as explained above, edge detection cannot be performed where the level of the analog read signal reduces and the amplitude of the signal is extremely small because of contamination of the surface of a recording medium by a fingerprint, dust or something, and a change in level at a to-be-detected edge portion of the analog read signal is equal to or lower than the edge detecting threshold value. In this case, no digitized signal can be generated. If such a state continues for a long time, the phases of the bit clock signal and the digitized signal cannot be compared with each other and hence will deviate from each other. In a fifth embodiment, a pseudo digitized signal is output when no trailing and leading edges cannot be detected for equal to or more than a predetermined period of time because of a reduction in the amplitude of the analog read signal S1, so as to prevent cycle deviation of the bit clock signal and minimize the occurrence of errors.

Figure 7:
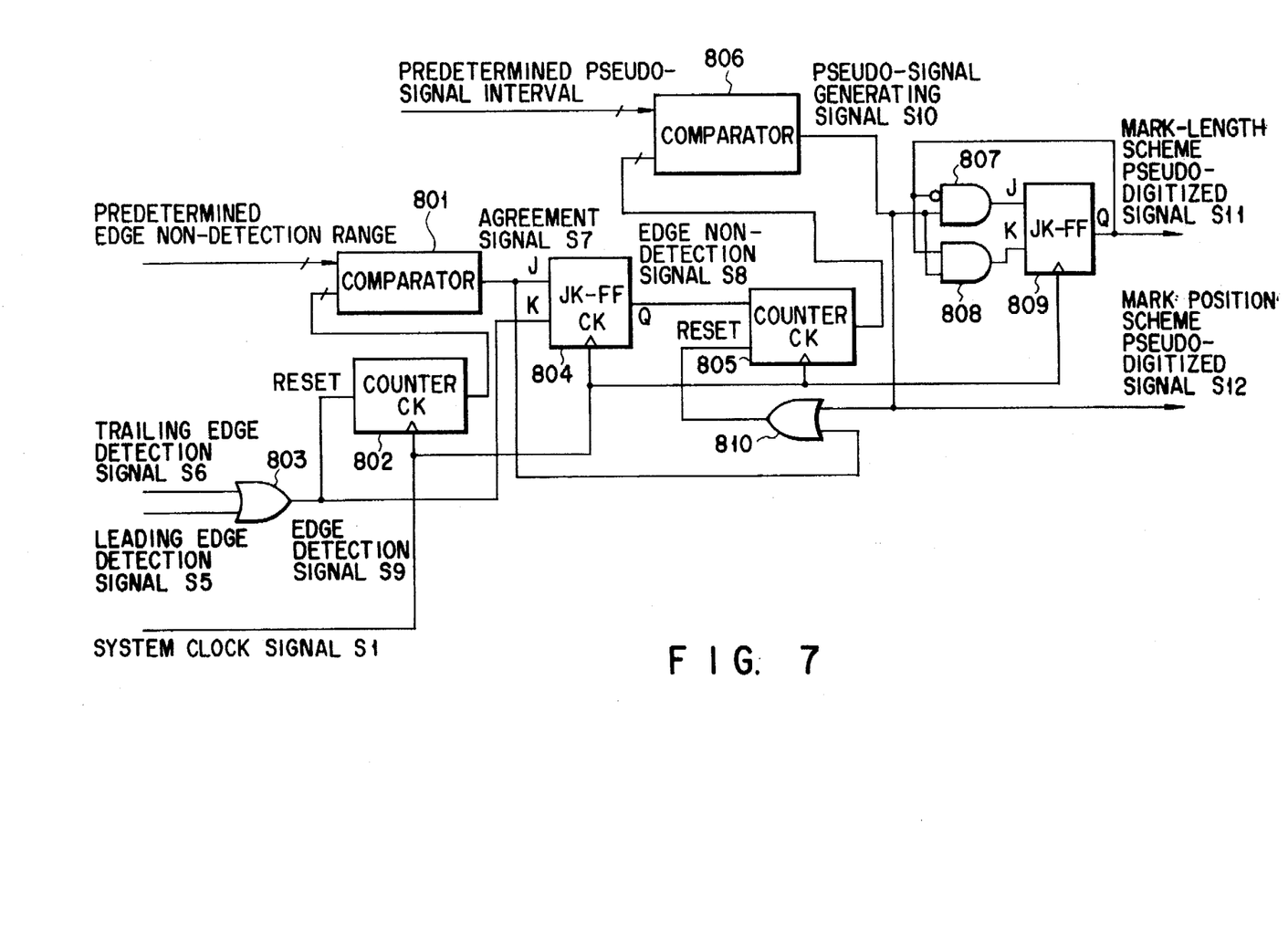
FIG. 7 is a schematic view, showing a pseudo digitized signal generating circuit according to a fifth embodiment of the invention.

FIG. 7 is a schematic view, showing a pseudo digitized signal generating circuit according to the fifth embodiment of the invention. In FIG. 7, a system clock signal is supplied to a counter 802. Further, a leading edge detecting signal S5 and a trailing edge detecting signal S6 are supplied to an OR gate 803. The output of the OR gate 803 is supplied to the reset input terminal of a counter 802 and also to an input terminal K of a JK-FF circuit 804.

The counter 802 is an up-counter for counting up in synchronism with the pulses of the system clock signal. The counter 802 is reset by the leading edge detecting signal S5 or the trailing edge detecting signal S6. The counter 802 supplies its count value to the comparator 801, which in turn compares the count value with a predetermined range in which no edge is detected (this range will hereinafter be referred to as a "predetermined edge non-detection range"). The predetermined edge non-detection range is set greater than the maximum pit interval.

If it is determined, as a result of comparison in the comparator 801, that the range indicated by the count value is equal to the predetermined edge non-detection range, it is determined that no edge is detected because of a change in the amplitude of the analog read signal S1. In this case, the comparator 801 supplies an input terminal J of the JK-FF circuit 804 with a signal S7 indicating that the ranges are equal to each other. The circuit 804 in turn generates a signal S8 indicating that no edge is detected, from its output terminal Q. The generation of the signal S8 is continued until a signal S9 indicating that an edge has been detected is generated from the OR gate 803 to an input terminal K of the JK-FF circuit 804.

On the other hand, the agreement signal S7 output from the comparator 801 is supplied to the reset input terminal of a counter 805 via an OR gate 810. The counter 805 counts up on the basis of the system clock signal, and supplies its count value to a comparator 806. The comparator 806 compares the count value with a predetermined pseudo signal interval which corresponds to a recording pit minimum interval.

If it is determined, as a result of comparison in the comparator 806, that the count value is equal to the predetermined pseudo signal interval, the comparator 806 generates a pseudo signal generating signal S10 to AND gates 807 and 808, and also to the reset input terminal of the counter 805 via the OR gate 810.

In the case of processing the mark position scheme signal, the comparator 806 generates the pseudo signal generating signal S10 as a pseudo pit detection signal, and the signal S10 is used as a mark position scheme pseudo digitized signal S12. On the other hand, in the case of processing the mark-length scheme signal, each time the pseudo signal generating signal S10 is supplied from the comparator 806 to the AND gates 807 and 808, the output Q of a JK-FF circuit 809 is inverted. The inverted output Q is used as a mark-length scheme pseudo digitized signal S11. While the edge non-detection signal S8 is output, the mark position scheme pseudo digitized signal S12 or the mark-length scheme pseudo digitized signal S11 is supplied to the buffer memory 111 as shown in FIG. 1 in place of the digitized signal based on the edge detection signal S9.

In the above-described fifth embodiment, even where the amplitude of the analog read signal is extremely small and its trailing edge and leading edge cannot be detected, cycle deviation of the bit clock signal can be prevented and hence the occurrence of errors be minimized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical data reproducing apparatus for reproducing data recorded on a predetermined optical data recording medium, comprising:

converting means for converting an analog signal corresponding to data to be reproduced, to a digital data item;

data memory means for storing, in time sequence, a plurality of data items output from said converting means;

comparing means for comparing a predetermined one of previous data items stored in said data memory means which are obtained in several sequential storage operations before a present storage operation having a present data item presently being stored in the data memory means;

edge detecting means for detecting an edge of the analog signal on the basis of the comparison result; and digitized signal generating means, comprising a mark-length scheme digitized signal generating section for generating a mark-length scheme digitized signal on the basis of an output from the edge detecting means and a mark position scheme digitized signal generating section for generating a mark position scheme digitized signal on the basis of the output from the edge detecting means.

2. The optical data reproducing apparatus according to claim 1, further comprising determining means for determining whether the digitized signal generated by the digitized signal generating means is of a mark-length scheme or of a mark position scheme.

3. The optical data reproducing apparatus according to claim 2, further comprising error correcting means for correcting an error in the digitized signal generated from at least one of the mark-length scheme digitized signal generating section and the mark position digitized signal generating section, and wherein the determining means determines whether or not the error correcting means has corrected the error in the digitized signal generated from at least one of the mark-length scheme digitized signal generating section and the mark position scheme digitized signal generating section.

4. The optical data reproducing apparatus according to claim 1, wherein:

when the comparing means indicates that a value of the previous data item stored in the memory means is higher than a value of the present data item, the edge detecting means compares an absolute value of a first difference between said previous and present data items with a predetermined first threshold value for detection of a trailing edge, thereby outputting a signal indicative of the detection of the trailing edge if the absolute value of the first difference exceeds the predetermined first threshold value; and when the comparing means indicates that the value of the previous data items stored in the data memory means is lower than the value of the present data item, the edge detecting means compares an absolute value of a second difference between said previous and present data items with a predetermined second threshold value for detection of a leading edge, thereby outputting a signal indicative of the detection of the leading edge if the absolute value of the second difference exceeds the predetermined second threshold value.

5. An optical data reproducing apparatus for reproducing data recorded on a predetermined optical data recording medium, comprising:

converting means for converting an analog signal corresponding to data to be reproduced, to a digital data item;

data memory means for storing, in time sequence, a plurality of data items output from said converting means;

comparing means for comparing a predetermined one of previous data items stored in said data memory means which are obtained in several sequential storage operations before a present storage operation having a present data item presently being stored in the data memory means;

edge detecting means for detecting an edge of the analog signal on the basis of the comparison result;

digitized signal generating means for generating a digitized signal on the basis of an output from the edge detecting means; and calculating means for calculating an average of at least one digital data item output from the converting means.

6. The optical data reproducing apparatus according to claim 5, wherein the digitized signal generating means comprises a mark-length scheme digitized signal generating section for generating a mark-length scheme digitized signal and a mark position scheme digitized signal generating section for generating a mark position scheme digitized signal.

7. The optical data reproducing apparatus according to claim 6, further comprising determining means for determining whether the digitized signal generated by the digitized signal generating means is of a mark-length scheme or of a mark position scheme.

8. An optical data reproducing apparatus for reproducing data recorded on a predetermined optical data recording medium, comprising:

converting means for converting an analog signal corresponding to data to be reproduced, to a digital data item;

data memory means for storing, in time sequence, a plurality of data items output from said converting means;

comparing means for comparing a predetermined one of previous data items stored in said data memory means which are obtained in several sequential storage operations before a present storage operation having a present data item presently being stored in the data memory means;

edge detecting means for detecting an edge of the analog signal on the basis of the comparison result;

digitized signal generating means for generating a digitized signal on the basis of an output from the edge detecting means; and reference voltage applying means for applying a reference voltage, which is altered in accordance with a change in the analog signal, to the converting means at the time of conversion of the analog signal to the digital data item.

9. The optical data reproducing apparatus according to claim 8, wherein the digitized signal generating means comprises a mark-length scheme digitized signal generating section for generating a mark-length scheme digitized signal and a mark position scheme digitized signal generating section for generating a mark position scheme digitized signal.

10. The optical data reproducing apparatus according to claim 9, further comprising determining means for determining whether the digitized signal generated by the digitized signal generating means is of a mark-length scheme or of a mark position scheme.

11. An optical data reproducing apparatus for reproducing data recorded on a predetermined optical data recording medium, comprising:

converting means for converting an analog signal corresponding to data to be reproduced, to a digital data item;

data memory means for storing, in time sequence, a plurality of data items output from said converting means;

comparing means for comparing a predetermined one of previous data items stored in said data memory means which are obtained in several sequential storage operations before a present storage operation having a present data item presently being stored in the data memory means;

edge detecting means for detecting an edge of the analog signal on the basis of the comparison result;

digitized signal generating means for generating a digitized signal on the basis of an output from the edge detecting means; and when the comparing means indicates that a value of a previous data item stored in the data memory means is higher than a value of the present data item, the edge detecting means compares an absolute value of a first difference between said previous and present data items with a predetermined first threshold value for detection of a trailing edge, thereby outputting a signal indicative of the detection of the trailing edge if the absolute value of the first difference exceeds the predetermined first threshold value; and when the comparing means indicates that the value of the previous data item stored in the data memory means is lower than the value of the present data item, the edge detecting means compares an absolute value of a second difference between the previous and present data items with a predetermined second threshold value for detection of a leading edge, thereby outputting a signal indicative of the detection of the leading edge if the absolute value of the second difference exceeds the predetermined second threshold value.

12. The optical data reproducing apparatus according to claim 11, wherein the edge detecting means changes the first and second threshold values in accordance with a change in the analog signal.

13. The optical data reproducing apparatus according to claim 12, wherein the digitized signal generating means comprises a mark-length scheme digitized signal generating section for generating a mark-length scheme digitized signal and a mark position scheme digitized signal generating section for generating a mark position scheme digitized signal.

14. The optical data reproducing apparatus according to claim 13, further comprising determining means for determining whether the digitized signal generated by the digitized signal generating means is of a mark-length scheme or of a mark position scheme.

15. The optical data reproducing apparatus according to claim 11, wherein the digitized signal generating means (i) generates a non-detection signal indicating that no edge is detected, when the edge detecting means does not detect a trailing edge or a leading edge for more than a predetermined period of time, (ii) generates a pseudo digitized signal when the non-detection signal has been generated, and (iii) stops the generation of the non-detection signal when the trailing edge or the leading edge has been detected by the edge detection means.

16. The optical data reproducing apparatus according to claim 15, wherein the digitized signal generating means comprises a mark-length scheme digitized signal generating section for generating a mark-length scheme digitized signal and a mark position scheme digitized signal generating section for generating a mark position scheme digitized signal.

17. The optical data reproducing apparatus according to claim 16, further comprising determining means for determining whether the digitized signal generated by the digitized signal generating means is of a mark-length scheme or of a mark position scheme.

* * * * *